(12) United States Patent
Tung et al.

(10) Patent No.: US 7,485,483 B2
(45) Date of Patent: Feb. 3, 2009

(54) METHODS OF FABRICATING ACTIVE DEVICE ARRAY SUBSTRATE AND FABRICATING COLOR FILTER SUBSTRATE

(75) Inventors: Yuan-Hung Tung, Taoyuan (TW); Chin-Kuo Ting, Taoyuan (TW)

(73) Assignee: AU Optronics Corp., Hsinchu (TW)

( * ) Notice: Subject to any disclaimer, the term of this patent is extended or adjusted under 35 U.S.C. 154(b) by 329 days.

(21) Appl. No.: 11/533,677

(22) Filed: Sep. 20, 2006

(65) Prior Publication Data

US 2007/0291206 A1 Dec. 20, 2007

(30) Foreign Application Priority Data

Jun. 20, 2006 (TW) .............................. 95122006 A

(51) Int. Cl.
*H01L 21/00* (2006.01)
(52) U.S. Cl. ........................... 438/30; 438/70; 349/106; 349/124
(58) Field of Classification Search ........................ None
See application file for complete search history.

(56) References Cited

U.S. PATENT DOCUMENTS

| | | | |
|---|---|---|---|
| 6,313,896 B1 | 11/2001 | Samant et al. | |
| 6,654,089 B2 | 11/2003 | Chaudhari et al. | |
| 6,949,389 B2 * | 9/2005 | Pichler et al. | ................. 438/26 |
| 2002/0031602 A1 * | 3/2002 | Zhang | .......................... 427/58 |
| 2003/0142257 A1 | 7/2003 | Chaudhari et al. | |
| 2005/0118455 A1 * | 6/2005 | Zhang | ........................ 428/890 |
| 2006/0046163 A1 * | 3/2006 | Broer et al. | .................... 430/7 |

FOREIGN PATENT DOCUMENTS

| | | |
|---|---|---|
| CN | 1329265 | 1/2002 |
| CN | 1661775 A | 8/2005 |

* cited by examiner

*Primary Examiner*—David E Graybill
(74) *Attorney, Agent, or Firm*—J.C. Patents

(57) ABSTRACT

A method of fabricating an active device array substrate is provided. First, a substrate is provided. A pixel array is formed on the substrate. An alignment material layer having a plurality of alignment regions is formed on the pixel array. A mask layer is formed on a portion of the alignment regions on the alignment material layer by using an inkjet printing process, so as to expose another portion of the alignment regions on the alignment material layer. Then, a particle beam alignment process is performed to the exposed alignment material layer. Then, the mask layer is removed. Another mask layer is formed on the alignment material layer which has been treated by the particle beam to expose the alignment material layer not treated by the particle beam. Another particle beam alignment process is performed to the exposed alignment material layer, and then the another mask layer is removed.

20 Claims, 20 Drawing Sheets

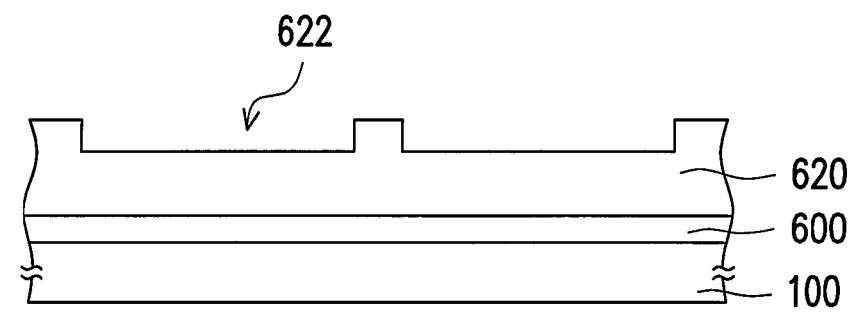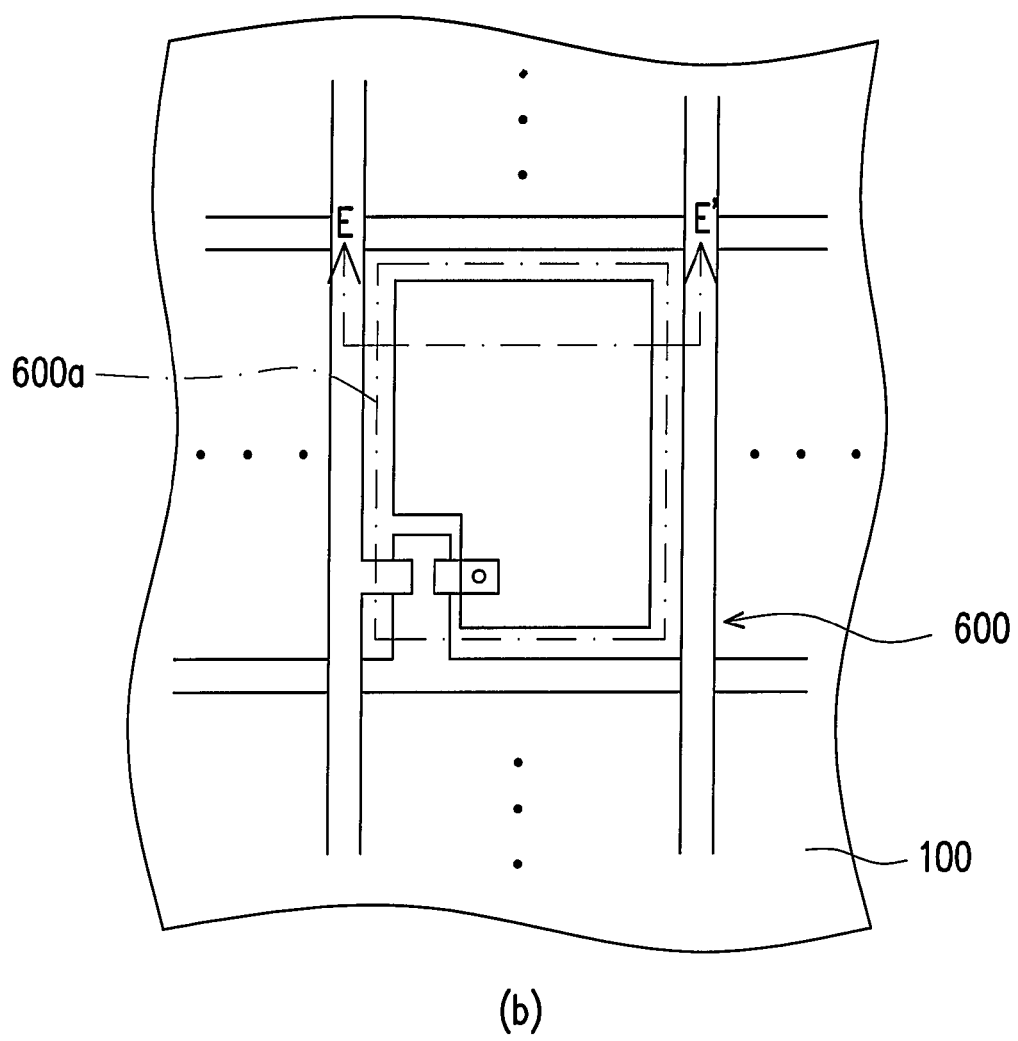
FIG. 1B

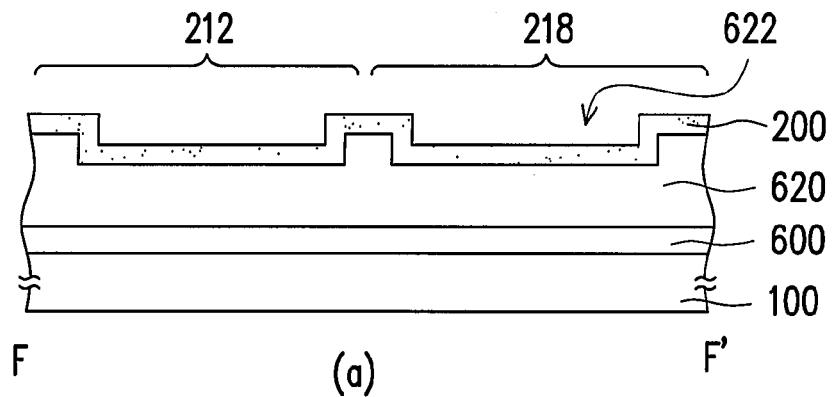
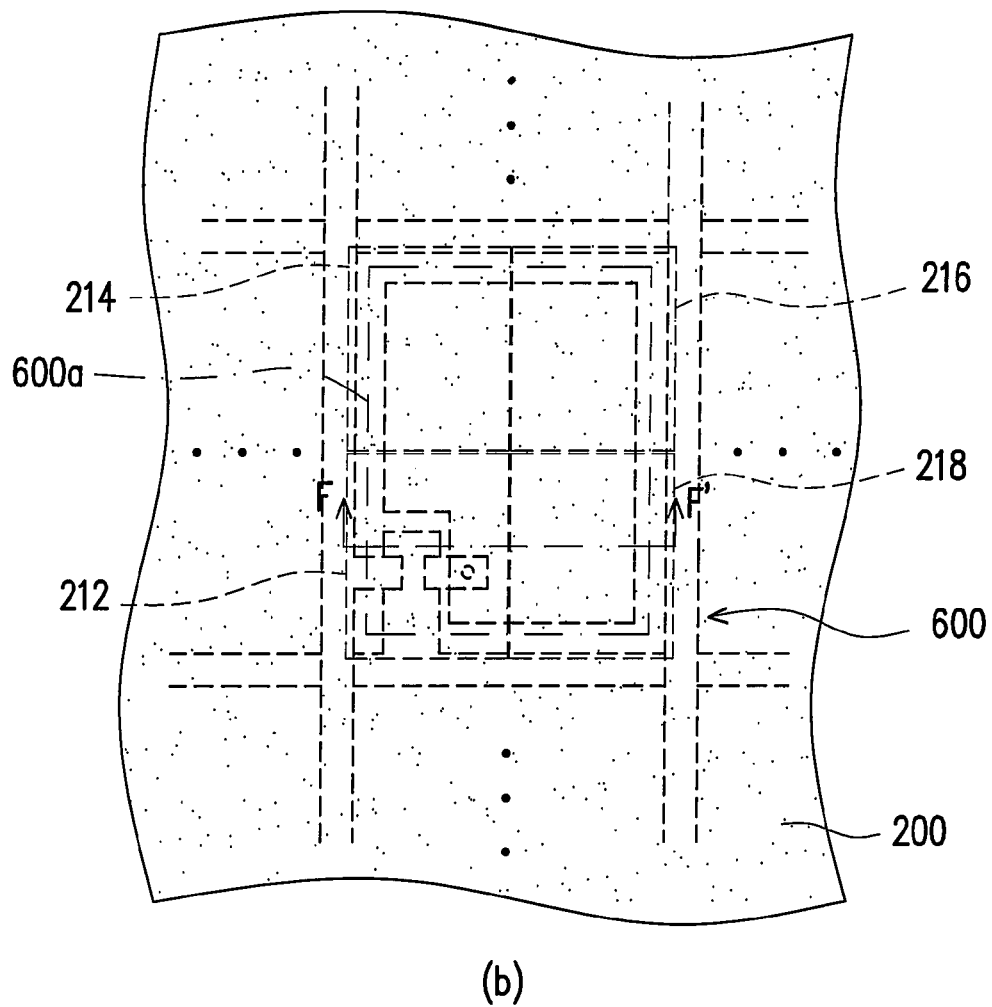
FIG. 1C

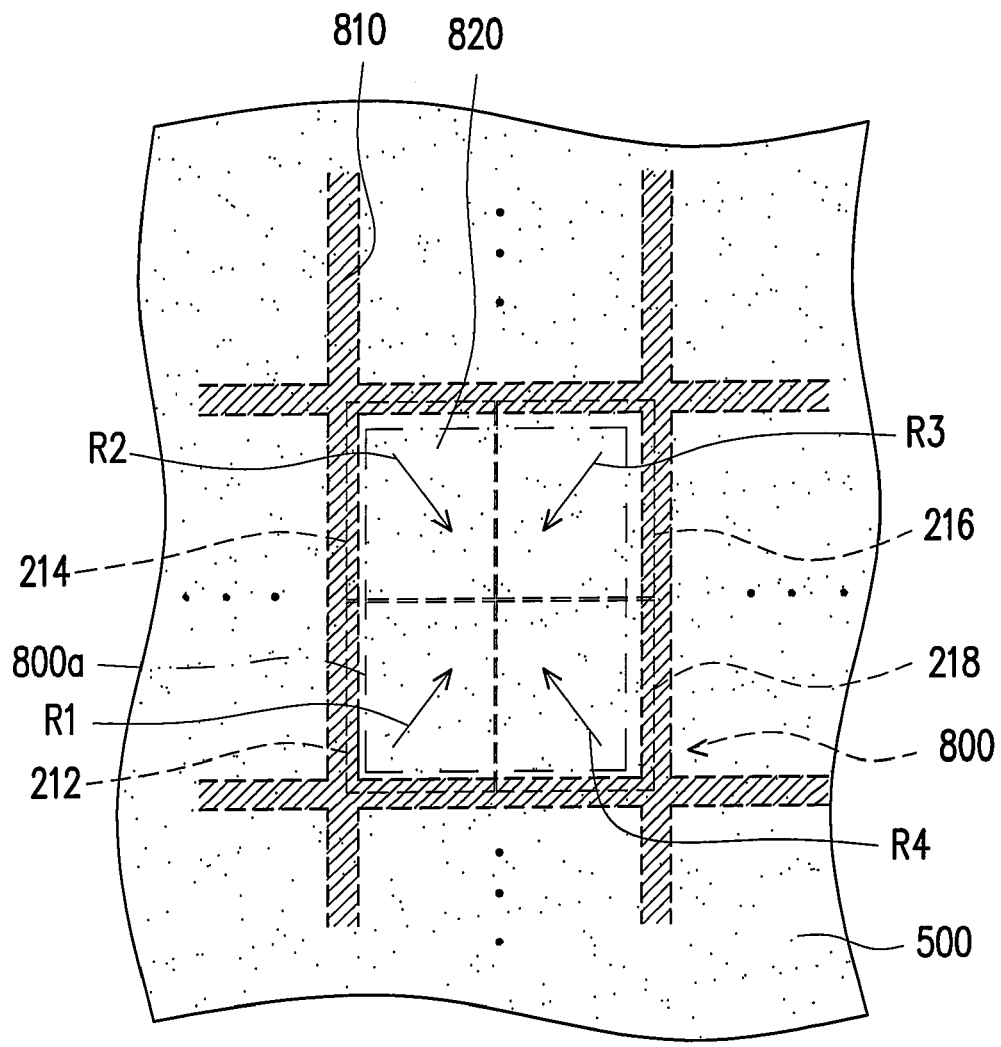
FIG. 2D     900

METHODS OF FABRICATING ACTIVE DEVICE ARRAY SUBSTRATE AND FABRICATING COLOR FILTER SUBSTRATE

CROSS-REFERENCE TO RELATED APPLICATION

This application claims the priority benefit of Taiwan application serial no. 95122006, filed on Jun. 20, 2006. All disclosure of the Taiwan application is incorporated herein by reference.

BACKGROUND OF THE INVENTION

1. Field of Invention

The present invention relates to methods of fabricating an array substrate and fabricating a filter substrate. More particularly, the present invention relates to methods of fabricating an active device array substrate and fabricating a color filter substrate of a liquid crystal display (LCD).

2. Description of Related Art

In current society, multimedia technology has been well developed, which mostly benefits from the development of semiconductor devices or display apparatuses. Among displays, liquid crystal displays, due to the superior characteristics of high picture quality, good space utilization, low power consumption, and radiation free, has gradually become the mainstream products in the market. A common LCD panel is mainly constituted of two substrates and a liquid crystal layer disposed between the two substrates. No matter for an active matrix LCD or a passive matrix LCD, two substrates must have alignment films, and the main function of the alignment films is aligning liquid crystal molecules to make the liquid crystal molecules assume a specific arrangement between the two substrates.

In a common twisted nematic (TN) LCD, the alignment film is fabricated after forming an alignment material layer, and an alignment process is performed by rubbing. More particularly, a roller with a rubbing cloth is used on the alignment material layer formed on a substrate to form a plurality of trenches on the surface of the alignment material layer, thereby forming an alignment film. As such, the liquid crystal molecules can be arranged along the trenches on the alignment film.

Another conventional alignment method makes use of an ion beam, which comprises using the ion beam to bombard the surface of the alignment material layer at a specific inclined angle, so as to achieve the alignment effect. That is, after forming an alignment material layer, a mask is formed by a lithography process to shield a portion of the region and expose other portions of the region. Then, the ion beam is irradiated to the surface of the alignment material layer along a specific direction. The details of the ion beam alignment method are disclosed in the patents such as U.S. Pat. Nos. 6,654,089, 6,313,896 and US 2003/0142257. However, the ion beam alignment method must employ a lithography process to form the mask, and due to the mask and exposure process, the process is complicated and has a high cost.

Besides the TN LCD, another common display is a multi-domain vertical alignment (MVA) LCD. In the MVA LCD with wide viewing angle, a plurality of protrusions or slit patterns are fabricated on the color filter substrate and/or thin film transistor array substrate. Through the protrusions and slit patterns, the liquid crystal molecules in different regions assume different arrangements, thereby achieving the purpose of wide viewing angle. However, electric field near the protrusions or slit patterns is non-uniform, thus easily resulting in the defect of mura. Moreover, the design of protrusions and slit patterns also reduces the transmittance and aperture ratio of the display panel.

SUMMARY OF THE INVENTION

In view of the above, an objective of the present invention is to provide a method of fabricating an active device array substrate, which can eliminate the mura of MVA LCD, and improve the transmittance and aperture ratio.

Another objective of the present invention is to provide a method of fabricating a color filter substrate, which can eliminate the mura of MVA LCD, and improve the transmittance and aperture ratio.

In order to achieve the above or other objectives, the present invention provides a method of fabricating an active device array substrate, which comprises the following steps. First, a substrate is provided. A pixel array is formed on the substrate. An alignment material layer having a plurality of alignment regions is formed on the pixel array. A mask layer is formed on a portion of the alignment regions on the alignment material layer by using an inkjet printing process, so as to expose another portion of the alignment regions on the alignment material layer. Then, a particle beam alignment process is performed to the exposed alignment material layer. Then, the mask layer is removed. Another mask layer is formed on the alignment material layer which has been treated by the particle beam to expose the alignment material layer not treated by the particle beam. Another particle beam alignment process is performed to the exposed alignment material layer, and then the another mask layer is removed.

In the method of fabricating an active device array substrate according to an embodiment of the present invention, the pixel array comprises a plurality of sub-pixels, and each of the sub-pixels corresponds to at least two alignment regions.

In the method of fabricating an active device array substrate according to an embodiment of the present invention, the pixel array comprises a plurality of sub-pixels, each of the alignment regions corresponds to at least two sub-pixels, and the alignment direction of each alignment region is different from the alignment directions of other alignment regions adjacent thereto.

In the method of fabricating an active device array substrate according to an embodiment of the present invention, the pixel array comprises a plurality of sub-pixels, each of the alignment regions corresponds to one sub-pixel, and the alignment direction of each alignment region is different from the alignment directions of other alignment regions adjacent thereto.

In the method of fabricating an active device array substrate according to an embodiment of the present invention, the alignment directions of the two particle beam alignment processes are different.

In the method of fabricating an active device array substrate according to an embodiment of the present invention, the material of the mask layers comprises organic material.

In the method of fabricating an active device array substrate according to an embodiment of the present invention, the formed alignment material layer has a first alignment region, a second alignment region, a third alignment region, and a fourth alignment region. After forming the alignment material layer, a first mask layer is formed in the second, third, and fourth alignment regions of the alignment material layer by using the inkjet printing process, so as to expose the first alignment region of the alignment material layer. A first particle beam alignment process is performed to the first alignment region of the alignment material layer, and then the first mask layer is removed. Then, a second mask layer is formed in the first, third, and fourth alignment regions of the alignment material layer by using the inkjet printing process, so as to expose the second alignment region of the alignment material layer. A second particle beam alignment process is performed to the second alignment region of the alignment material layer, and then the second mask layer is removed. Thereafter, a third mask layer is formed in the first, second, and fourth alignment regions of the alignment material layer by using the inkjet printing process, so as to expose the third alignment region of the alignment material layer. A third particle beam alignment process is performed to the third alignment region of the alignment material layer, and then the third mask layer is removed. Then, a fourth mask layer is formed in the first, second, and third alignment regions of the alignment material layer by using the inkjet printing process, so as to expose the fourth alignment region of the alignment material layer. A fourth particle beam alignment process is performed to the fourth alignment region of the alignment material layer, and then the fourth mask layer is removed.

In the method of fabricating an active device array substrate according to an embodiment of the present invention, the alignment directions of the first alignment region, the second alignment region, the third alignment region, and the fourth alignment region are all different.

In the method of fabricating an active device array substrate according to an embodiment of the present invention, the material of the alignment material layer comprises polyimide, polyamide, polyvinyl alcohol (PVA), polyvinyl chloride (PVC), diamond like carbon (DLC), SiC, $SiO_2$, $Si_3N_4$, $Al_2O_3$, or $SnO_2$.

In the method of fabricating an active device array substrate according to an embodiment of the present invention, after forming the pixel array, the method further comprises forming an insulating layer on the pixel array, and the insulating layer has a plurality of recesses each of which corresponds to one of the alignment regions.

The present invention further provides a method of fabricating a color filter substrate, which comprises the following steps. First, a substrate is provided. A color filter array is formed on the substrate. An alignment material layer having a plurality of alignment regions is formed on the color filter array. A mask layer is formed on a portion of the alignment regions on the alignment material layer by using an inkjet printing process, so as to expose another portion of the alignment regions on the alignment material layer. Then, a particle beam alignment process is performed to the exposed alignment material layer. Then, the mask layer is removed. Another mask layer is formed on the alignment material layer which has been treated by the particle beam to expose the alignment material layer not treated by the particle beam. Another particle beam alignment process is performed to the exposed alignment material layer, and then the another mask layer is removed.

In the method of fabricating a color filter substrate according to an embodiment of the present invention, the color filter array comprises a plurality of color filter patterns, and each of the color filter patterns corresponds to at least two alignment regions.

In the method of fabricating a color filter substrate according to an embodiment of the present invention, the color filter array comprises a plurality of color filter patterns, each of the alignment regions corresponds to at least two color filter patterns, and the alignment direction of each alignment region is different from the alignment directions of other alignment regions adjacent thereto.

In the method of fabricating a color filter substrate according to an embodiment of the present invention, the color filter array comprises a plurality of color filter patterns, each of the alignment regions corresponds to one color filter pattern, and the alignment direction of each alignment region is different from the alignment directions of other alignment regions adjacent thereto.

In the method of fabricating a color filter substrate according to an embodiment of the present invention, the alignment directions of the two particle beam alignment processes are different.

In the method of fabricating a color filter substrate according to an embodiment of the present invention, the material of the mask layers comprises organic material.

In the method of fabricating a color filter substrate according to an embodiment of the present invention, the formed alignment material layer has a first alignment region, a second alignment region, a third alignment region, and a fourth alignment region. After forming the alignment material layer, a first mask layer is formed in the second, third, and fourth alignment regions of the alignment material layer by using the inkjet printing process, so as to expose the first alignment region of the alignment material layer. A first particle beam alignment process is performed to the first alignment region of the alignment material layer, and then the first mask layer is removed. Then, a second mask layer is formed in the first, third, and fourth alignment regions of the alignment material layer by using the inkjet printing process, so as to expose the second alignment region of the alignment material layer. A second particle beam alignment process is performed to the second alignment region of the alignment material layer, and then the second mask layer is removed. Thereafter, a third mask layer is formed in the first, second, and fourth alignment regions of the alignment material layer by using the inkjet printing process, so as to expose the third alignment region of the alignment material layer. A third particle beam alignment process is performed to the third alignment region of the alignment material layer, and then the third mask layer is removed. Then, a fourth mask layer is formed in the first, second, and third alignment regions of the alignment material layer by using the inkjet printing process, so as to expose the fourth alignment region of the alignment material layer. A fourth particle beam alignment process is performed to the fourth alignment region of the alignment material layer, and then the fourth mask layer is removed.

In the method of fabricating a color filter substrate according to an embodiment of the present invention, the alignment directions of the first alignment region, the second alignment region, the third alignment region, and the fourth alignment region are all different.

In the method of fabricating a color filter substrate according to an embodiment of the present invention, the material of the alignment material layer comprises polyimide, polyamide, polyvinyl alcohol (PVA), polyvinyl chloride (PVC), diamond like carbon (DLC), SiC, $SiO_2$, $Si_3N_4$, $Al_2O_3$, or $SnO_2$.

In the method of fabricating a color filter substrate according to an embodiment of the present invention, the method of forming the color filter array comprises forming a black matrix on the substrate and forming a plurality of color filter patterns between the patterns of the black matrix, wherein the thickness of the black matrix is larger than that of the color filter patterns.

In the methods for fabricating an active device array substrate and fabricating a color filter substrate of the present invention, the alignment method of alignment films employs the inkjet printing process to form mask layers in specific regions. Compared with the conventional art using the lithography process to form mask layers, the methods of fabricating an active device array substrate and fabricating a color filter substrate of the present invention have the advantages of being simple and low cost. The fabricated active device array substrate and color filter substrate can be used to assemble an LCD panel, so as to make the liquid crystal molecules being arranged in different directions. Therefore, the present invention can achieve the LCD panel with wide viewing angle without using the designs of slit patterns or protrusions. In addition, the LCD panel assembled by the active device array substrate and/or color filter substrate of the present invention has higher aperture ratio and transmittance, and mura does not easily occur.

In order to make the aforementioned and other objects, features and advantages of the present invention comprehensible, preferred embodiments accompanied with figures are described in detail below.

BRIEF DESCRIPTION OF THE DRAWINGS

FIG. 2A to FIG. 2D are simplified flow charts of the method of fabricating a color filter substrate according to an embodiment of the present invention.

DESCRIPTION OF EMBODIMENTS

Figure 1A:
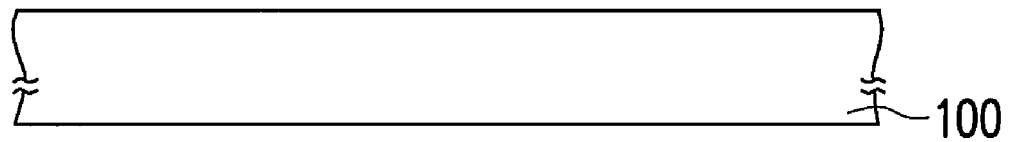
FIG. 1A to FIG. 1O are flow charts of the method of fabricating an active device array substrate according to an embodiment of the present invention.

FIG. 1A to FIG. 1O are flow charts of the method of fabricating an active device array substrate according to an embodiment of the present invention. In order to clearly illustrate the processes of the method of fabricating an active device array substrate, the top view and sectional view are simultaneously shown in some figures. Referring to FIG. 1A, the method of fabricating an active device array substrate comprises providing a substrate 100, and the substrate 100 is, for example, a glass substrate, a quartz substrate, or a substrate made of another appropriate material.

Referring to FIG. 1B, a pixel array 600 having a plurality of sub-pixels 600a is formed on the substrate 100. After forming the pixel array 600, an insulating layer 620 is further formed on the pixel array 600. In a preferred embodiment, the insulating layer 620 has a plurality of recesses 622.

Referring to FIG. 1C, an alignment material layer 200 is formed on the pixel array 600, and the material of the alignment material layer 200 is, for example, polyimide, polyamide, polyvinyl alcohol (PVA), polyvinyl chloride (PVC), diamond like carbon (DLC), SiC, $SiO_2$, $Si_3N_4$, $Al_2O_3$, or $SnO_2$ or another appropriate material. The alignment material layer 200 has a first alignment region 212, a second alignment region 214, a third alignment region 216, and a fourth alignment region 218. More particularly, each of the sub-pixels 600a corresponds to at least two alignment regions, and in this embodiment, each of the sub-pixels 600a corresponds to the first alignment region 212, the second alignment region 214, the third alignment region 216, and the fourth alignment region 218. Moreover, each of the recesses 622 corresponds to one of the alignment regions.

It should be noted that in the present invention, each sub-pixel is designed to correspond to at least two alignment regions, and additionally, each alignment region can also be designed to correspond to at least two sub-pixels, and the alignment direction of each alignment region is different from the alignment directions of the alignment regions adjacent thereto. According to another embodiment of the present invention, one sub-pixel is correspondingly disposed in each alignment region, and the alignment direction of each alignment region is different from the alignment directions of other alignment regions adjacent thereto.

Then, referring to FIG. 1D to FIG. 1O, the first alignment region 212, the second alignment region 214, the third alignment region 216, and the fourth alignment region 218 of the alignment material layer 200 are respectively treated by the particle beam alignment process, and the detailed steps thereof are described as follows.

Figure 1D:
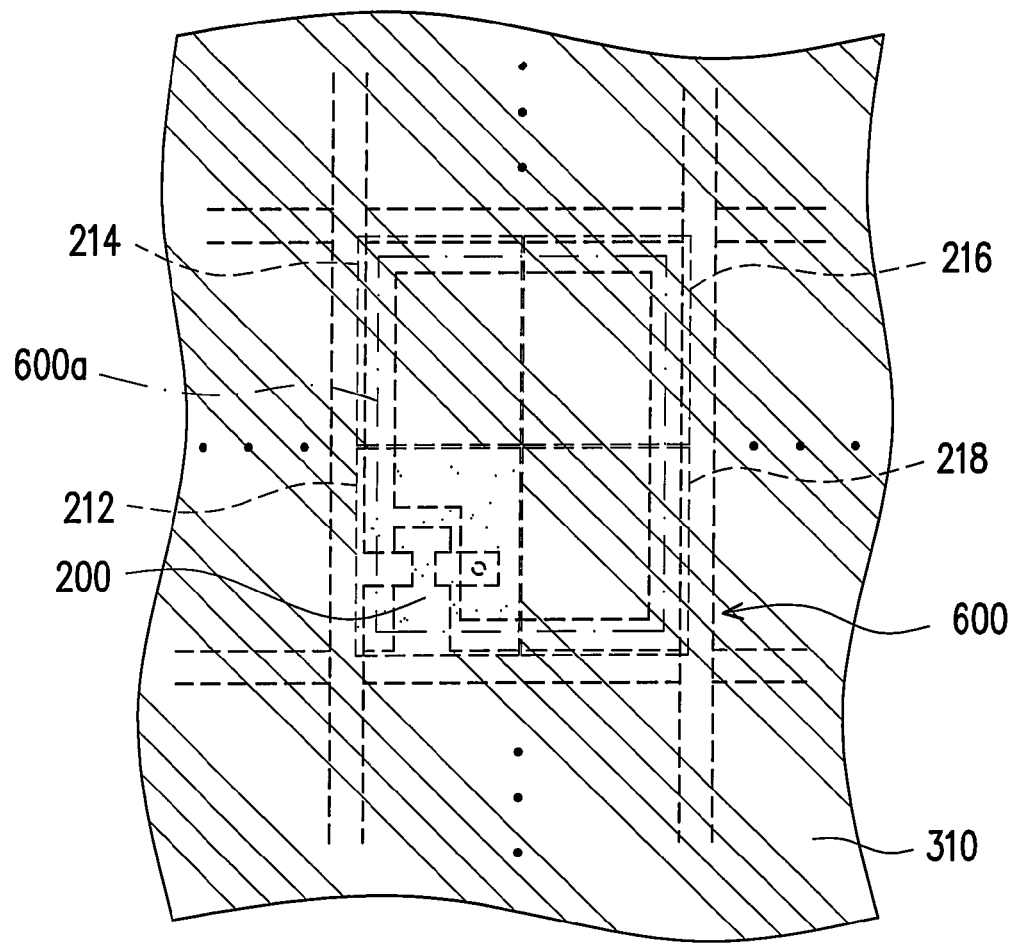

As shown in FIG. 1D, a first mask layer 310 is formed on the second alignment region 214, third alignment region 216, and fourth alignment region 218 of the alignment material layer 200 by using an inkjet printing process, so as to expose the first alignment region 212 of the alignment material layer 200. The material of the first mask layer 310 is, for example, organic material or another appropriate material.

Figure 1E:
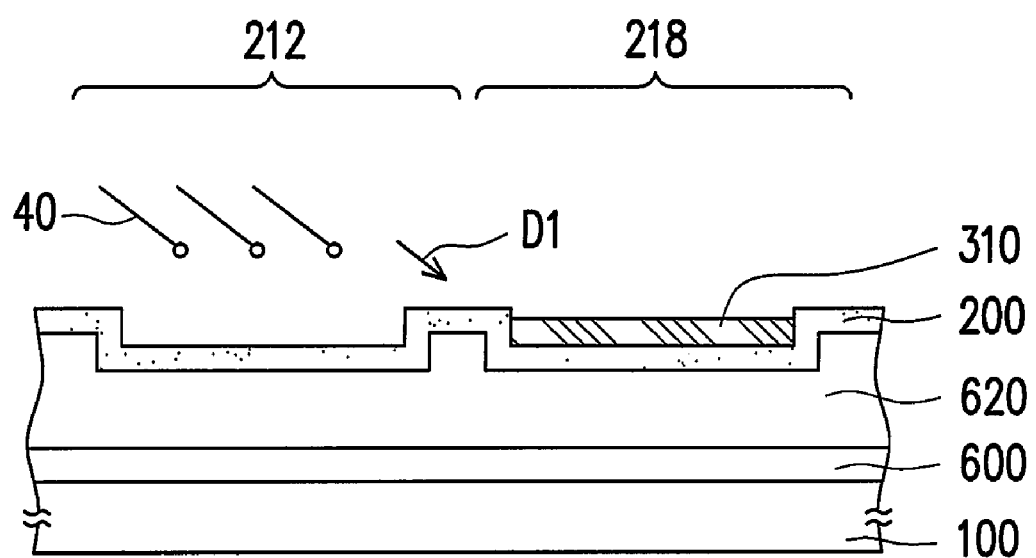

As shown in FIG. 1E, a particle beam 40 is used to bombard the surface of the alignment material layer 200 along a first direction D1, so as to perform a particle beam alignment process to the first alignment region 212 of the exposed alignment material layer 200. The particle beam 40 is, for example, an ion beam, an atom beam, or the like.

Figure 1F:
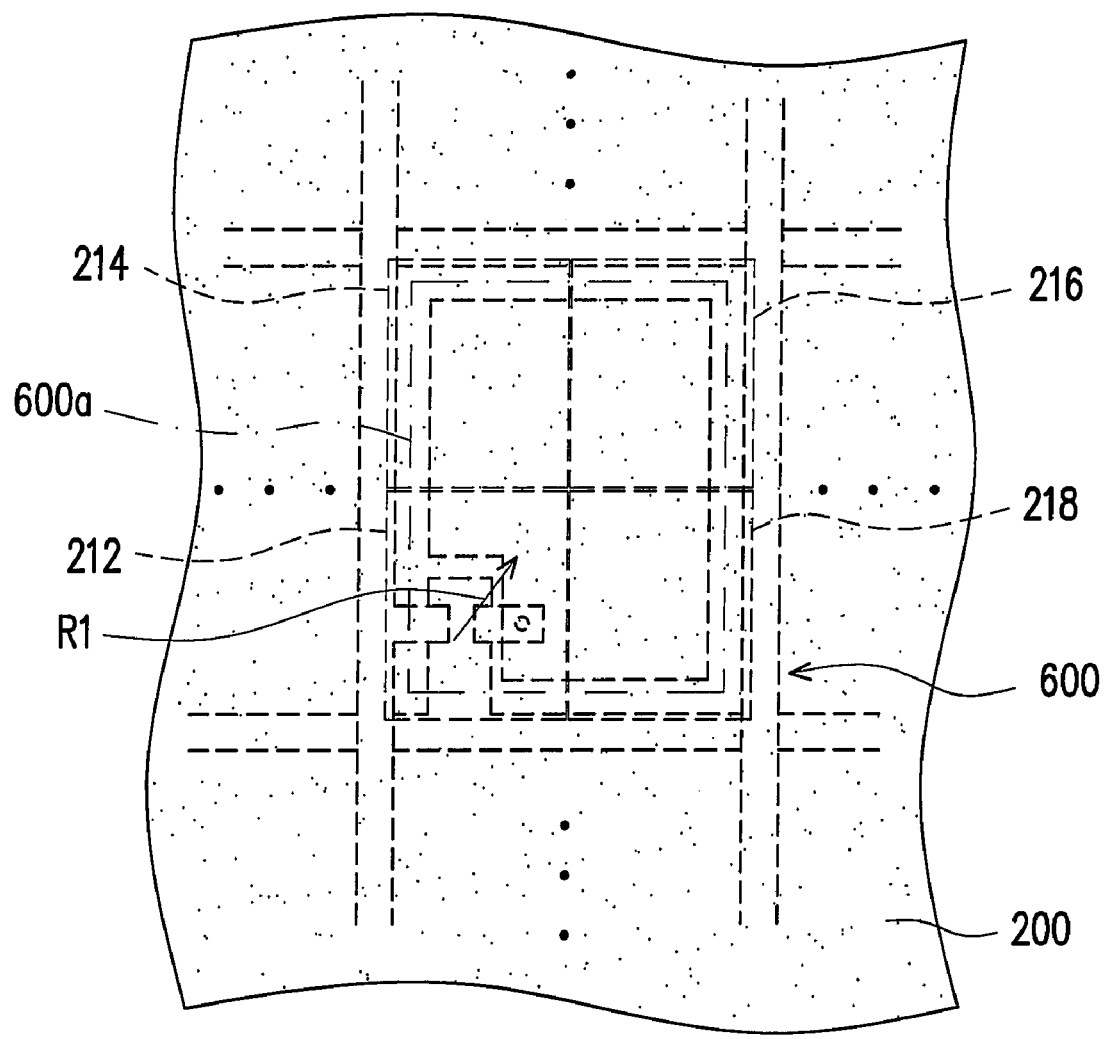

As shown in FIG. 1F, after the particle beam alignment process is complete, the first alignment region 212 has a first alignment direction R1. Then, the first mask layer 310 is removed. The method of removing the first mask layer 310, for example, uses a wet etching process to peel the first mask layer 310, and the formula used in the wet etching is, for example, $H_2SO_4$ aqueous solution, $H_2SO_4$ containing ozone, aqueous solution containing ozone, or another appropriate solution. However, the method of removing the first mask layer 310 is not limited to the wet etching.

Figure 1G:
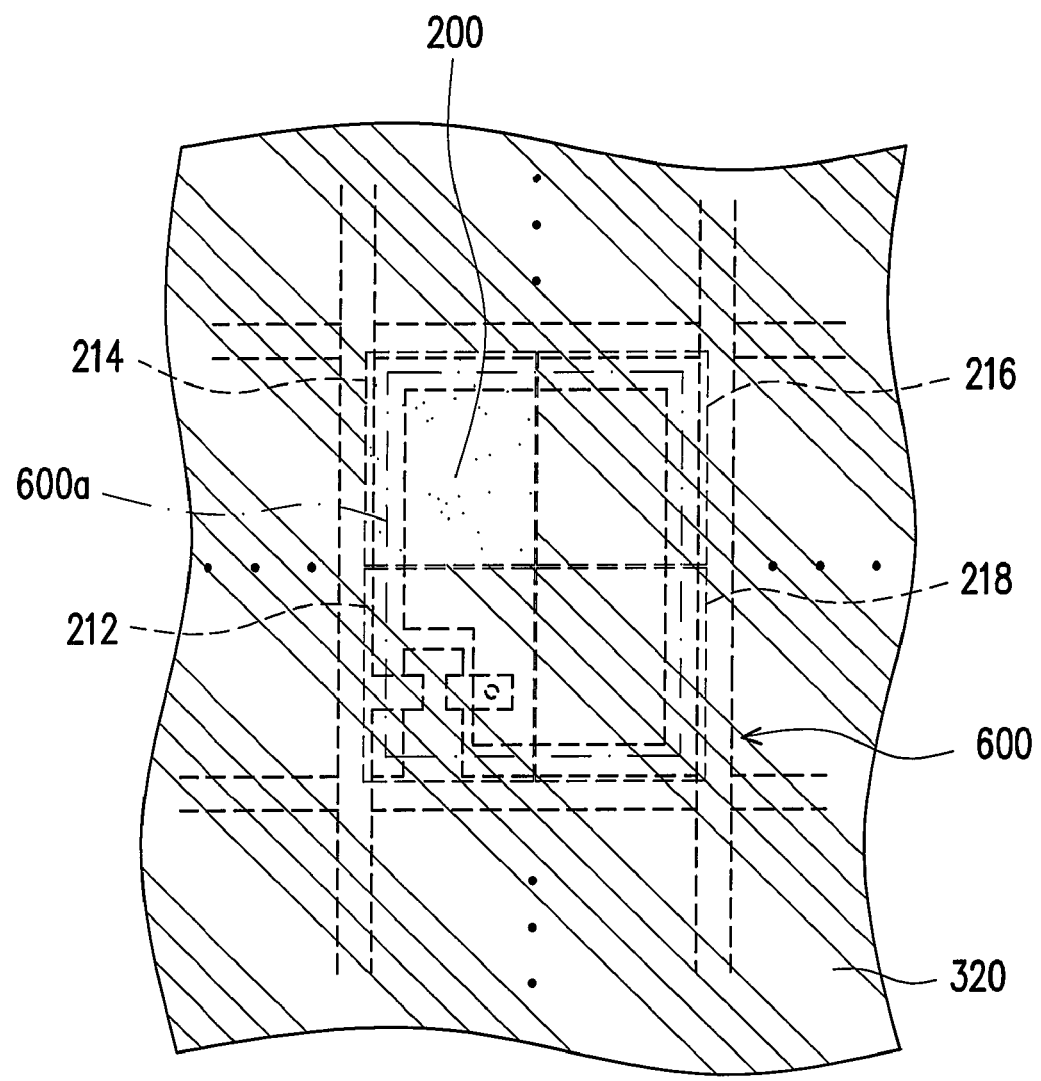

As shown in FIG. 1G, a second mask layer 320 is formed in the first alignment region 212, third alignment region 216, and fourth alignment region 218 of the alignment material layer 200 by using the inkjet printing process, so as to expose the second alignment region 214 of the alignment material layer 200. The material of the second mask layer 320 is, for example, the same as that of the first mask layer 310.

Figure 1H:
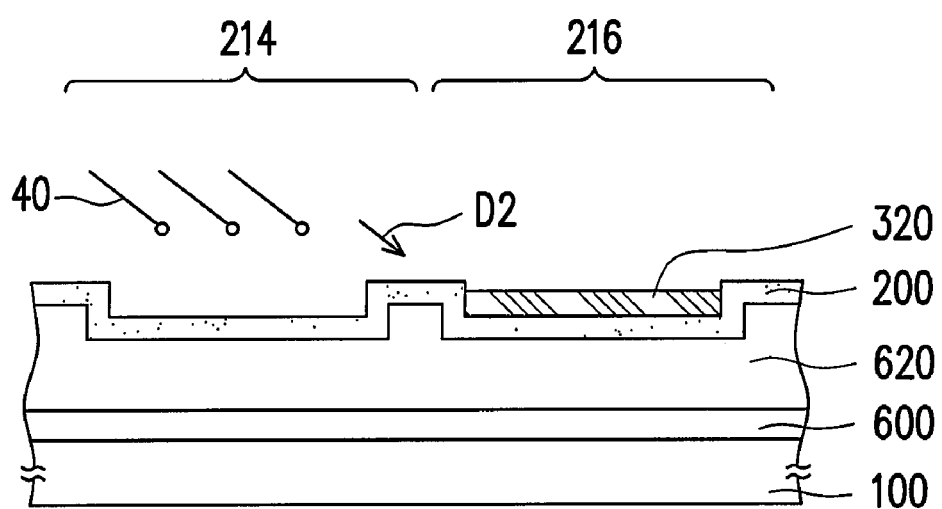

As shown in FIG. 1H, the particle beam 40 bombards the surface of the alignment material layer 200 along a second direction D2, so as to perform a particle beam alignment process to the second alignment region 214 of the exposed alignment material layer 200.

Figure 1I:
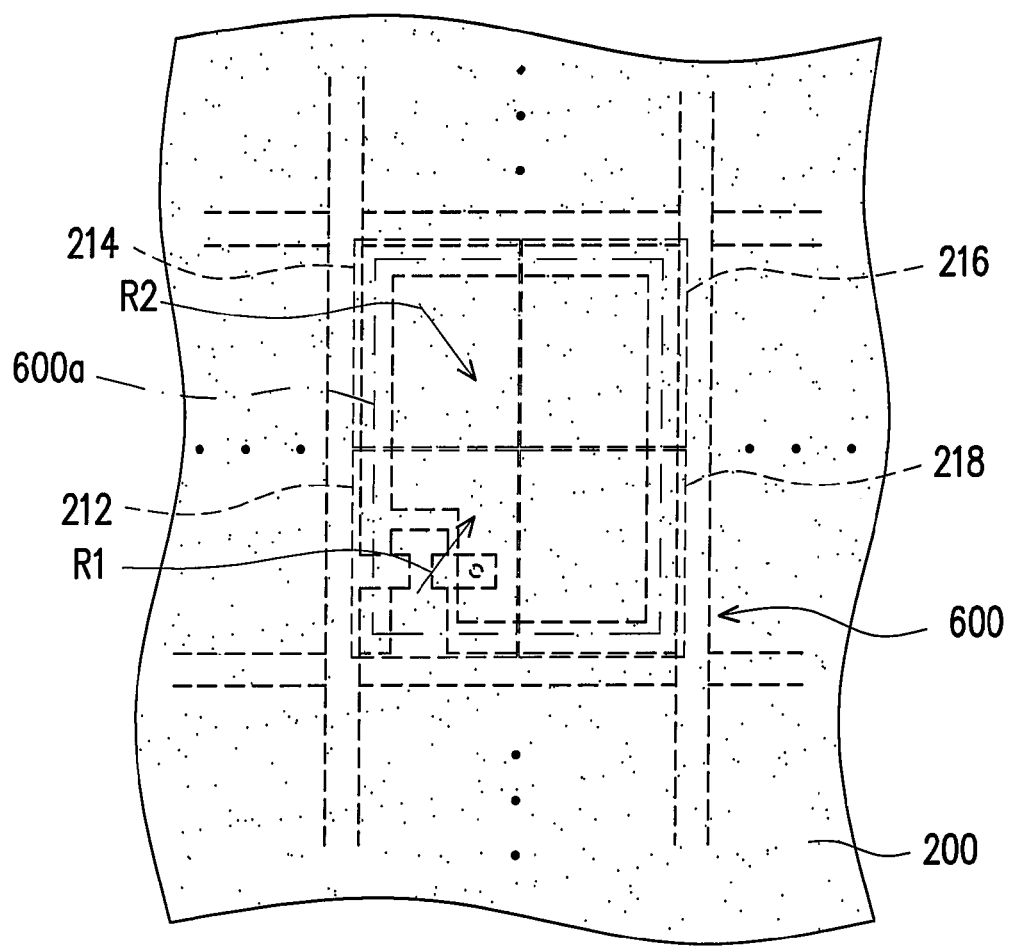

As shown FIG. 1I, after the particle beam alignment process is complete, the second alignment region 214 has a second alignment direction R2. Then, the second mask layer 320 is removed.

Figure 1J:
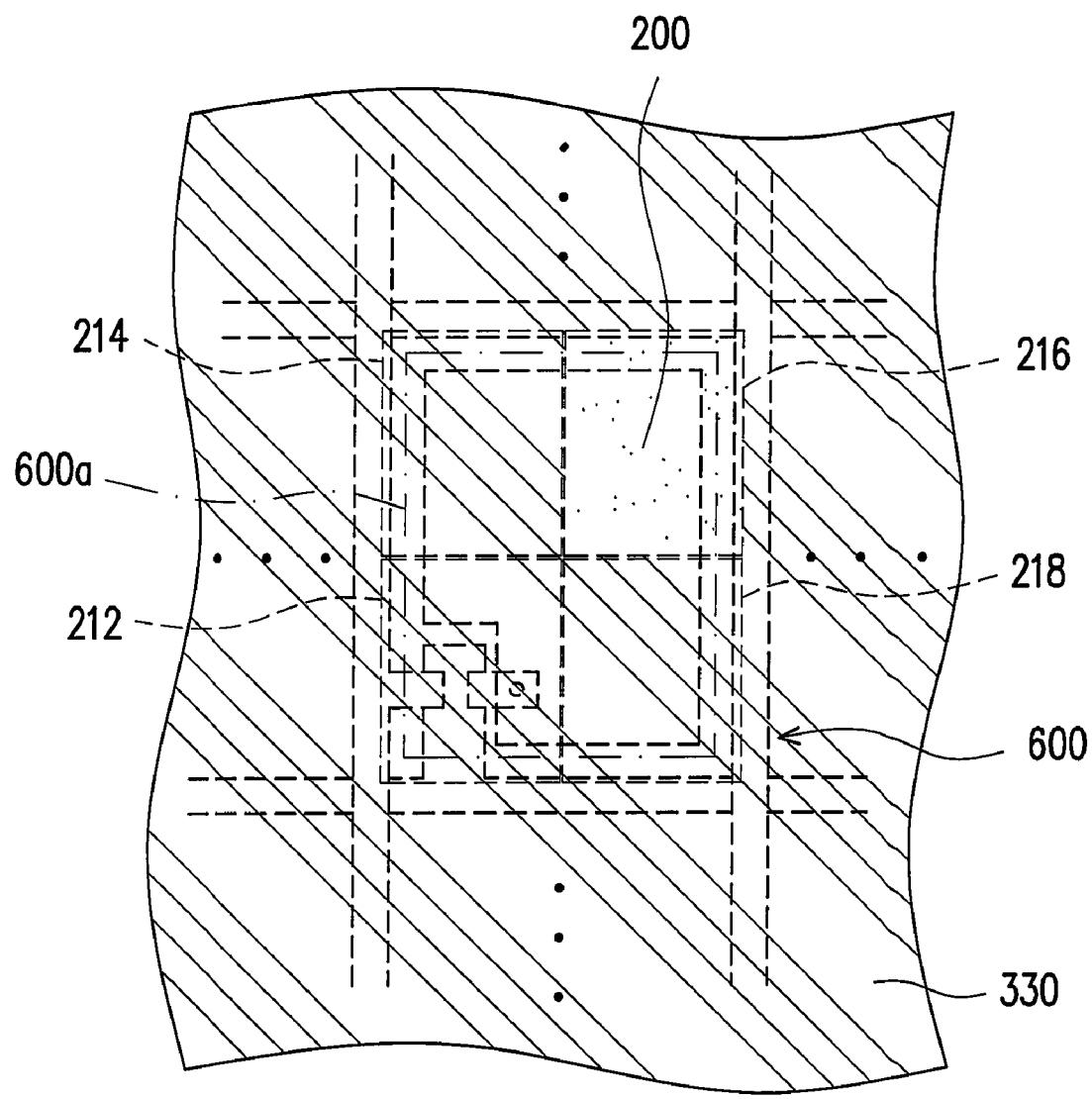

As shown in FIG. 1J, a third mask layer 330 is formed in the first alignment region 212, second alignment region 214, and fourth alignment region 218 of the alignment material layer 200 by using the inkjet printing process, so as to expose the third alignment region 216 of the alignment material layer 200. The material of the third mask layer 330 is, for example, the same as that of the first mask layer 310.

Figure 1K:
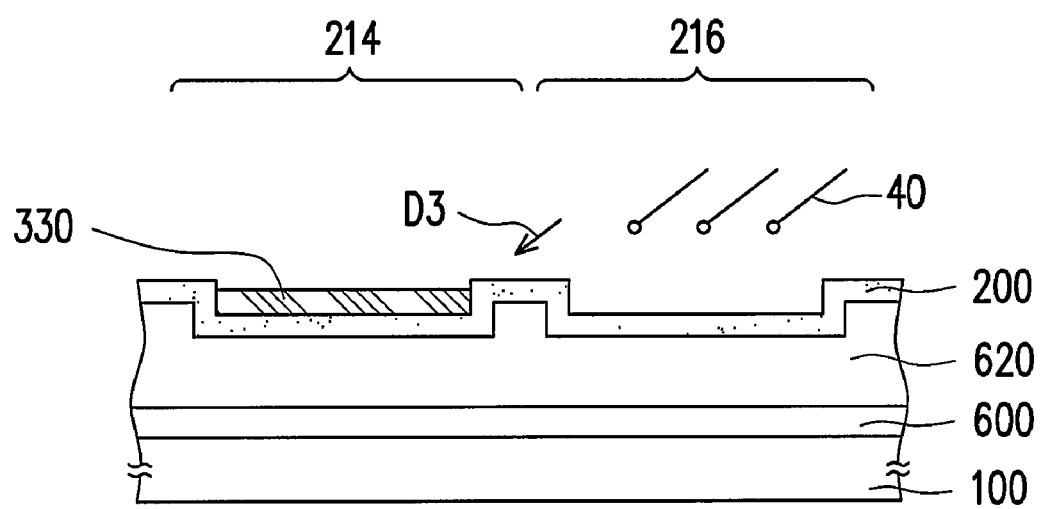

As shown in FIG. 1K, the particle beam 40 bombards the surface of the alignment material layer 200 along a third direction D3, so as to perform a particle beam alignment process to the third alignment region 216 of the exposed alignment material layer 200.

Figure 1L:
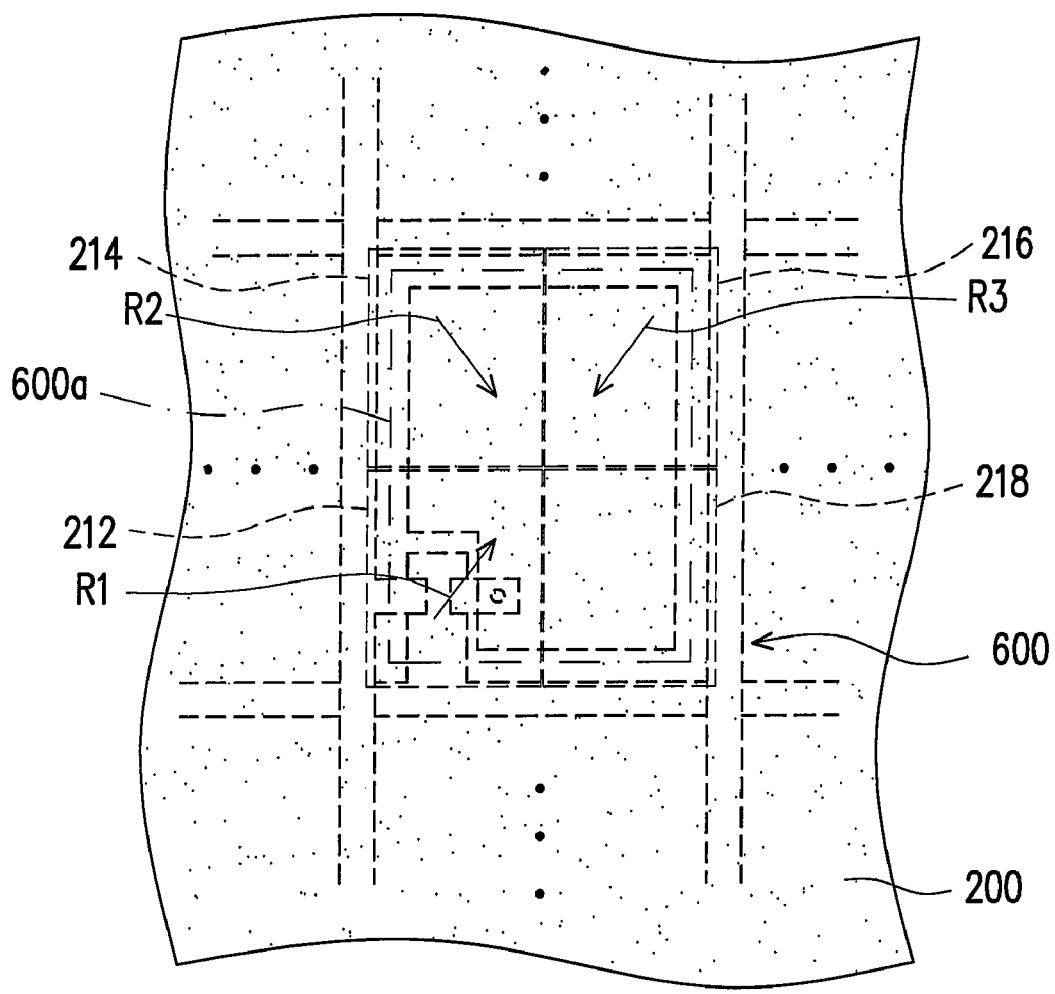

As shown in FIG. 1L, after the particle beam alignment process is complete, the third alignment region 216 has a third alignment direction R3. Then, the third mask layer 330 is removed.

Figure 1M:
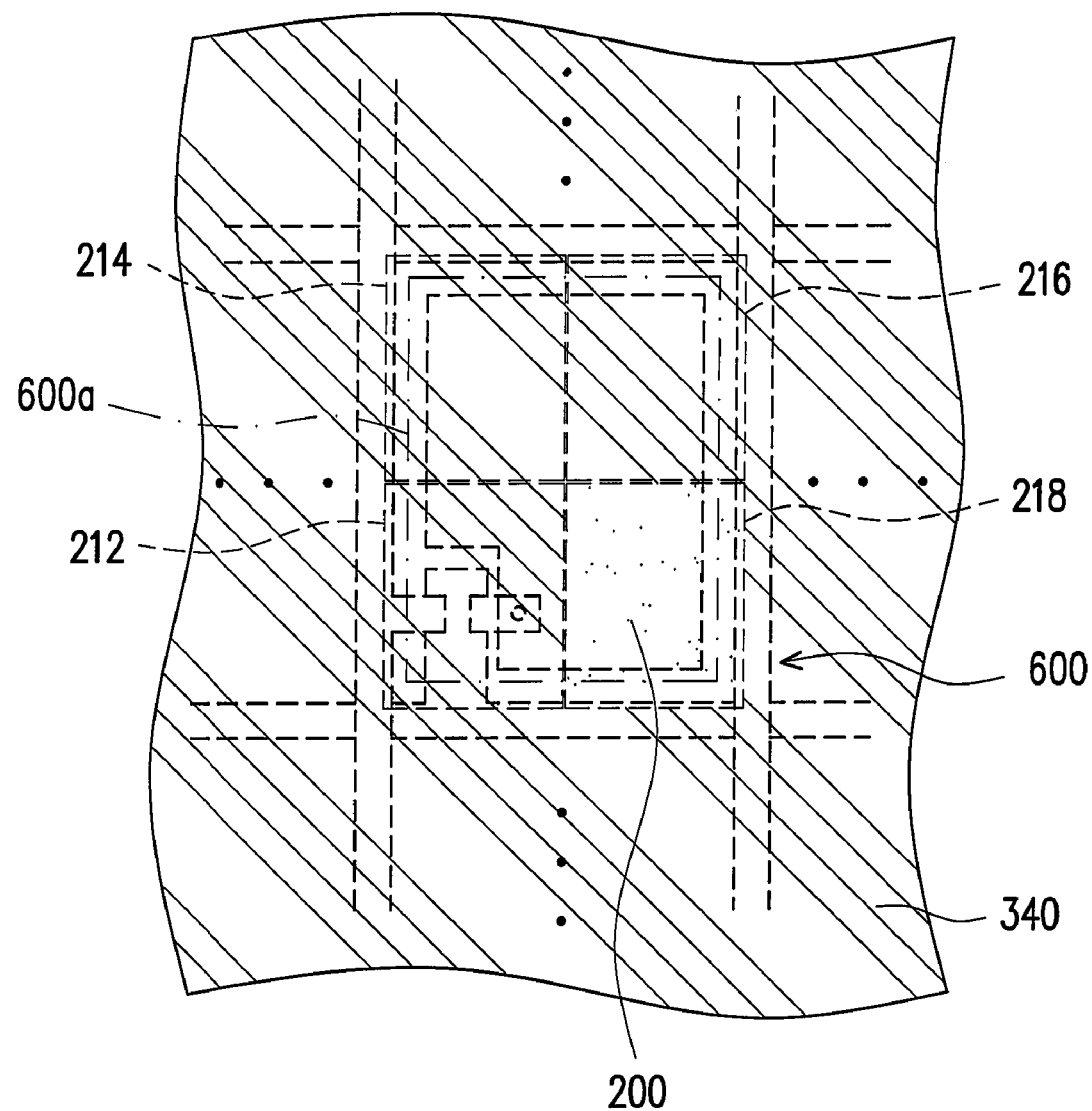

As shown in FIG. 1M, a fourth mask layer 340 is formed in the first alignment region 212, second alignment region 214, and third alignment region 216 of the alignment material layer 200 by using the inkjet printing process, so as to expose the fourth alignment region 218 of the alignment material layer 200. The material of the fourth mask layer 340 is, for example, the same as that of the first mask layer 310.

Figure 1N:
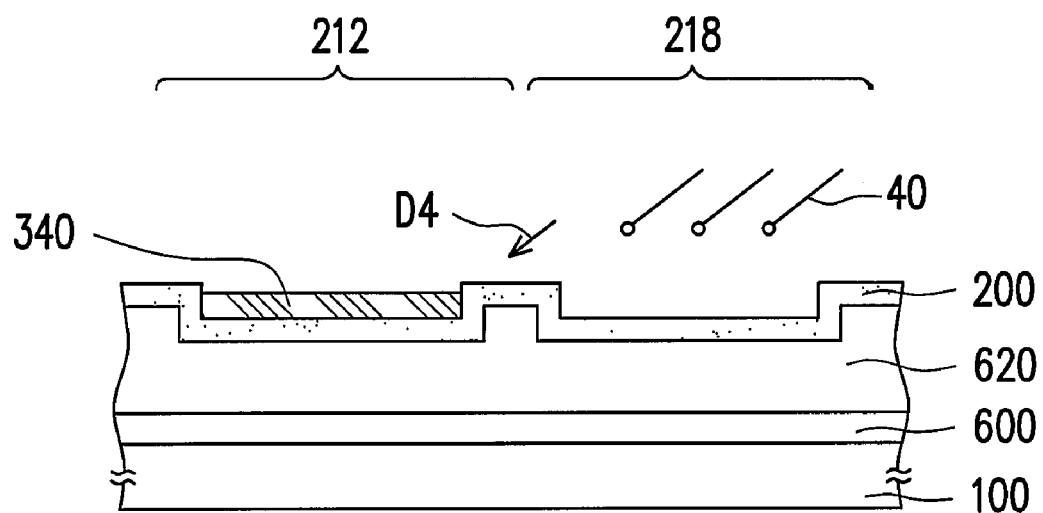
Figure 10:
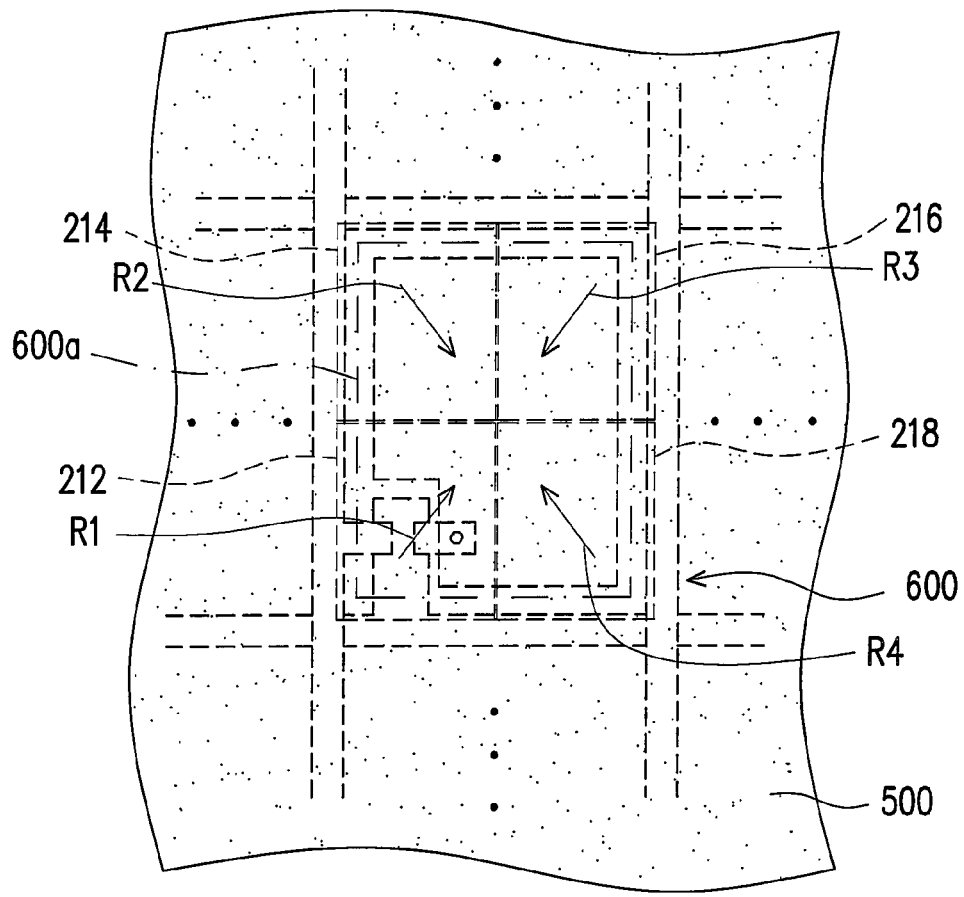

As shown in FIG. 1N, the particle beam 40 bombards the surface of the alignment material layer 200 along a fourth direction D4, so as to perform a particle beam alignment process to the fourth alignment region 218 of the exposed alignment material layer 200.

As shown in FIG. 1O, after the particle beam alignment process is complete, the fourth alignment region 218 has a fourth alignment direction R4. Then, the fourth mask layer 340 is removed.

After completing the above steps, the active device array substrate 700 is formed. It should be noted that in the above steps, the particle beam 40 is irradiated to the surface of the alignment material layer 200 along different directions, so the first direction D1, the second direction D2, the third direction D3, and the fourth direction D4 are all different. Moreover, the alignment directions of the first alignment region 212, the second alignment region 214, the third alignment region 216, and the fourth alignment region 218 are all different. In other words, the first alignment direction R1, the second alignment direction R2, the third alignment direction R3, and the fourth alignment direction R4 are all different.

In this embodiment, the alignment method of the alignment film employs the inkjet printing process to form the first mask layer 310, the second mask layer 320, the third mask layer 330, and the fourth mask layer 340, so as to respectively align the first alignment region 212, the second alignment region 214, the third alignment region 216, and the fourth alignment region 218 by the particle beam. Since mask layers can be formed in specific regions by using the inkjet printing process, compared with the conventional method, the method of fabricating an active device array substrate of the present invention is simple and has a low cost.

It should be noted that the insulating layer 620 has a plurality of recesses 622 (as shown in FIG. 1C), and each of the recesses 622 corresponds to one of the alignment regions. Therefore, when performing the inkjet printing process to form a mask layer on a specific alignment region, the organic material sprayed in the inkjet printing process does not diffuse to the alignment region to be treated by the particle beam due to the retaining wall around the recess. For example, FIG. 1E is a schematic sectional view of the step of aligning the first alignment region 212 in the above alignment process. When forming the first mask layer 310 by using the inkjet printing process, the first mask layer 310 does not diffuse to the first alignment region 212 to be treated by the particle beam.

In addition, it should be noted that in FIG. 1O, since the alignment directions of the first, second, third, and fourth alignment regions 212, 214, 216, 218 are different, if an LCD panel (not shown) is assembled by the active device array substrate 700 and another substrate, the liquid crystal molecules above different alignment regions are arranged in different directions, and thus the LCD panel can have a larger viewing range, so as to achieve the wide viewing angle. Moreover, the LCD panel can achieve the wide viewing angle without using the design of slit patterns or protrusions in the pixel electrodes on the active device array substrate 700. Therefore, mura does not easily occur in the LCD panel assembled by the active device array substrate 700, and the LCD has higher transmittance and aperture ratio.

It should be noted that in this embodiment, the method of fabricating an active device array substrate is illustrated by forming the alignment film 500 having four alignment regions. However, the method of fabricating an active device array substrate provided by the present invention is not limited to fabricate the alignment film 500 having four alignment regions. In addition, each of the sub-pixels 600a is not limited to corresponding to four alignment regions.

It should also be noted that the method of fabricating an active device array substrate comprises forming an insulating layer 620 on the pixel array, in which the insulating layer 620 has many recess patterns 622. However, the method of fabricating an active device array substrate of the present invention is not limited to form the insulating layer 620 having recess patterns 622, and is also not limited to from the insulating layer on the pixel array. If the insulating layer formed in the method of fabricating an active device array substrate of the present invention does not have recess patterns, and even the insulating layer is not formed, when performing the inkjet printing process to form a mask layer on a specific alignment region, the diffusion of the sprayed organic material may cause an uneven profile of the edge of the formed mask layer, thus resulting in the incomplete alignment of the edge of the alignment regions. However, after an LCD panel (not shown) is formed by assembling the active device array substrate (not shown), the edge of each alignment region corresponds to the black matrix of the color filter substrate (not shown) thereabove, such that the incompletely aligned edges of the alignment regions are shielded. Therefore, the display quality of the assembled LCD panel is not affected.

Figure 2A:
Figure 2B:
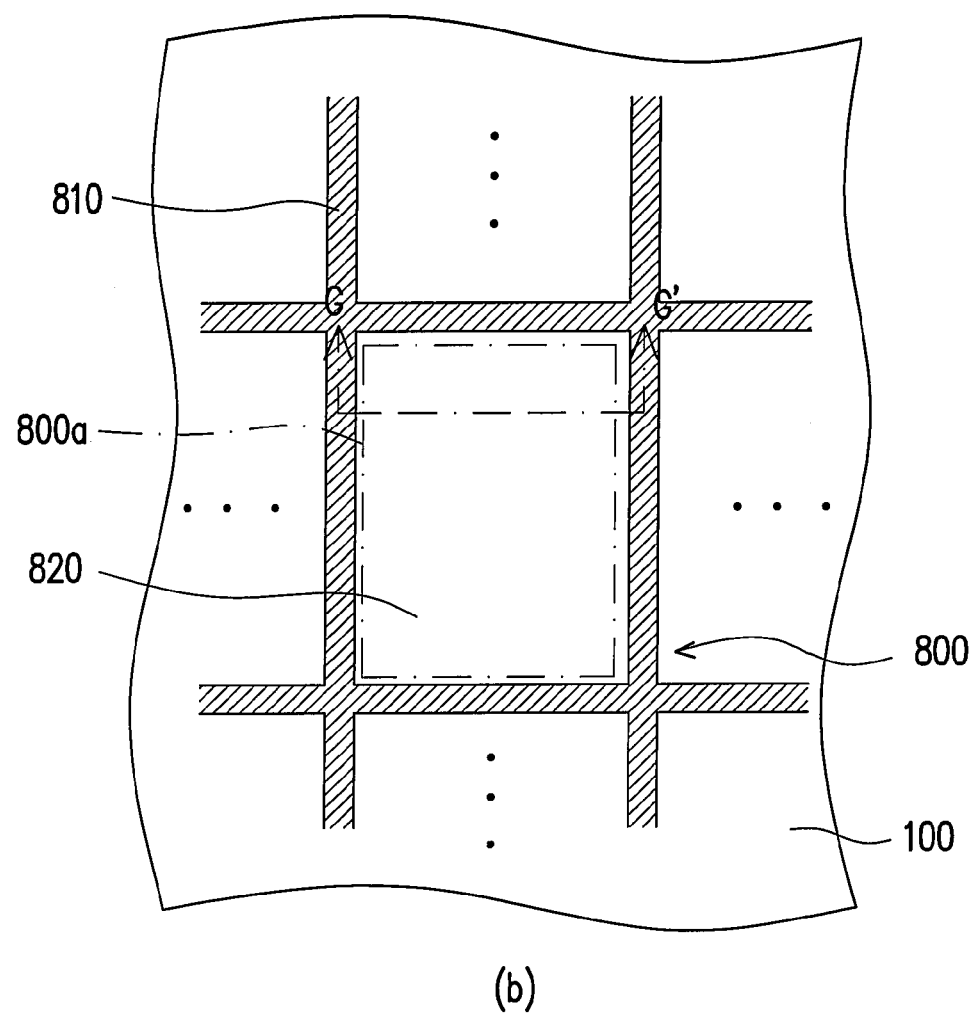

FIG. 2A to FIG. 2D are simplified flow charts of the method of fabricating a color filter substrate according to an embodiment of the present invention. In order to clearly illustrate the processes of the method of fabricating an active device array substrate, the top view and sectional view thereof are simultaneously shown in some figures. Referring to FIG. 2A, the method of fabricating a color filter substrate comprises providing a substrate 100. Then, referring to FIG. 2B, a color filter array is 800 is formed on the substrate 100. The method of forming the color filter array 800 comprises forming a black matrix 810 on the substrate 100 and forming a plurality of color filter patterns 820 between the patterns of the black matrix 810, so as to form a plurality of sub-pixels 800a, wherein the thickness of the black matrix 810 is, for example, larger than that of the color filter patterns 820. In an embodiment, the black matrix 810 is formed first, and then, the color filter pattern 820 is formed. Definitely, in the present invention, the color filter pattern can be formed first, and then the black matrix is formed.

Figure 2C:
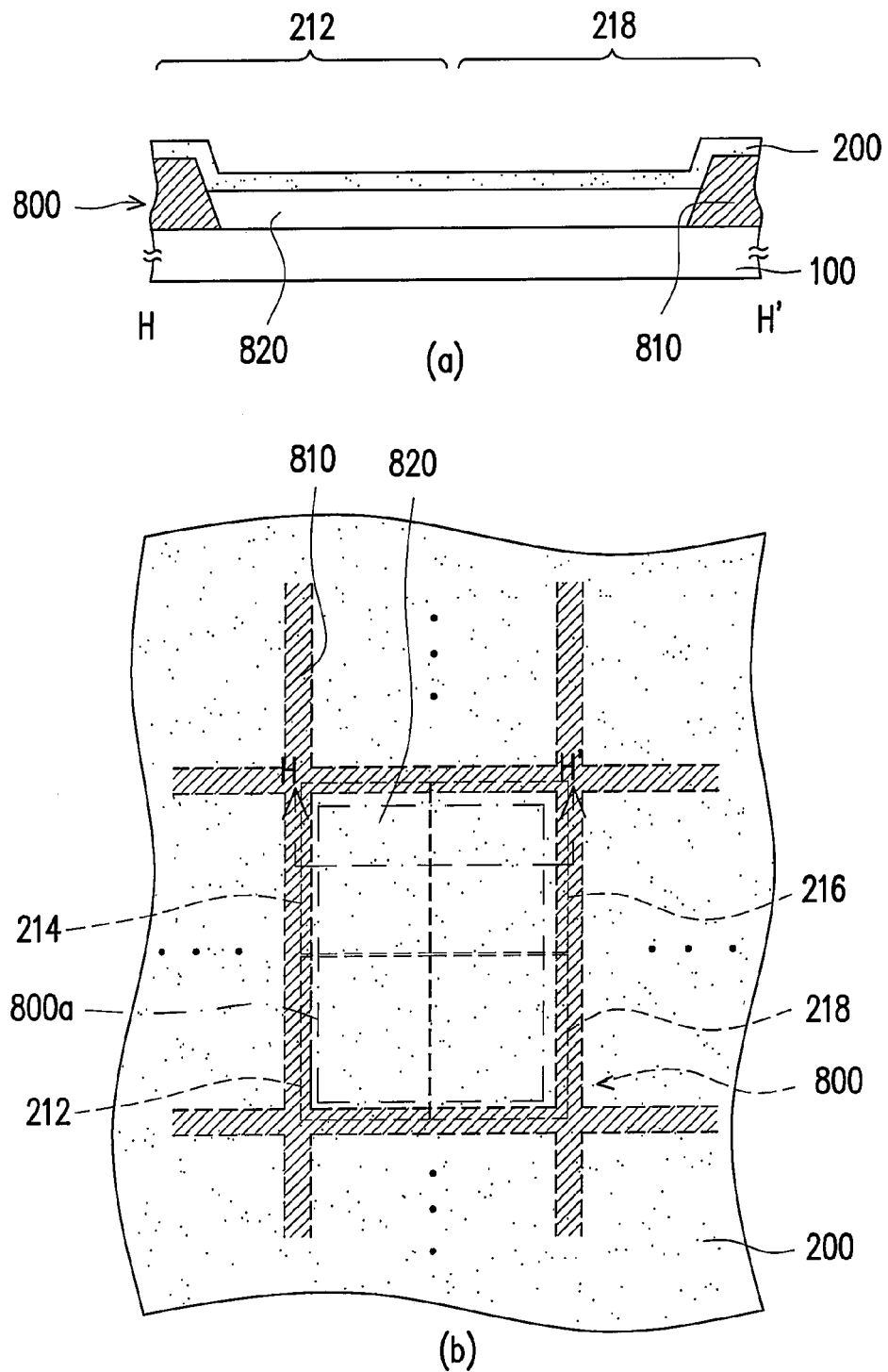

Referring to FIG. 2C, an alignment material layer 200 is formed on the color filter array 800. The alignment material layer 200 is the same as that described above. Each of the color filter patterns 820 corresponds to at least two alignment regions. In this embodiment, each of the color filter patterns 820 corresponds to the first alignment region 212, the second alignment region 214, the third alignment region 216, and the fourth alignment region 218. That is, each of the sub-pixels 800a corresponds to the first alignment region 212, the second alignment region 214, the third alignment region 216, and the fourth alignment region 218.

It should be noted that in the present invention, each color filter pattern is designed to correspond to at least two alignment regions, and additionally each alignment region can be designed to correspond to at least two color filter patterns, and the alignment direction of each alignment region is different from the alignment directions of the alignment regions adjacent thereto. According to another embodiment of the present invention, one color filter pattern is correspondingly disposed in each alignment region, and the alignment direction of each alignment region is different from the alignment directions of the alignment regions adjacent thereto.

Figure 3:
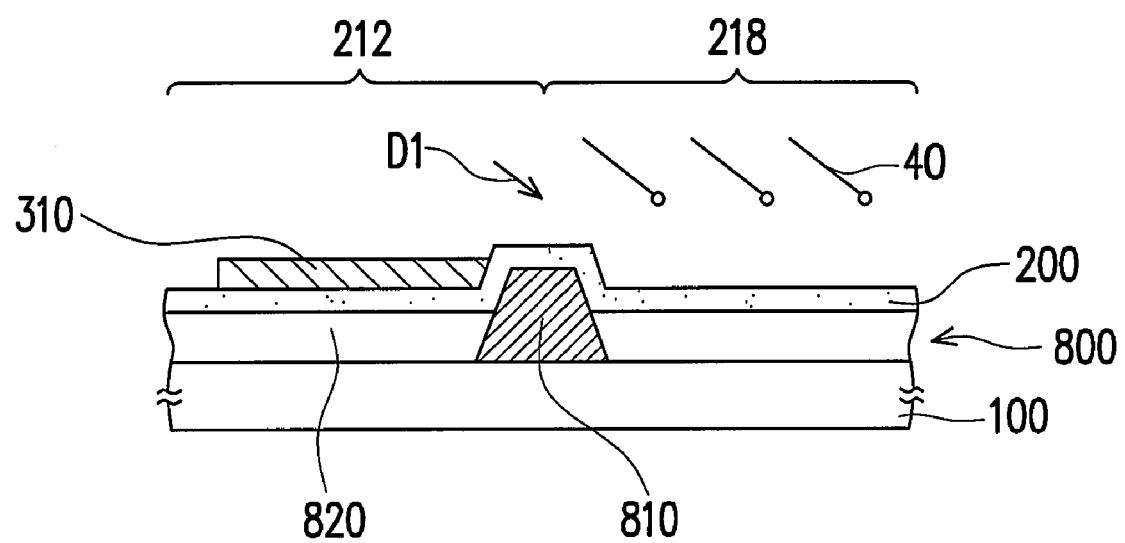
FIG. 3 is a schematic sectional view of the step of aligning the first alignment region in the method of fabricating the color filter substrate.

Then, the first alignment region 212, the second alignment region 214, the third alignment region 216, and the fourth alignment region 218 of the alignment material layer 200 are treated by the particle beam alignment process, so as to form an alignment film 500. The alignment method is also the same as those as shown in FIG. 1D to FIG. 1O, and the details will not be described herein again, and only the finished alignment film 500 and color filter substrate 900 are shown in FIG. 2D. It should be particularly noted that the thickness of the black matrix 810 is larger than that of the color filter patterns 820. Therefore, when performing the inkjet printing process to form a mask layer in a specific alignment region, the sprayed organic material does not diffuse to the alignment region to be treated by the particle beam from the adjacent alignment region due to the retaining function of the black matrix 810. For example, FIG. 3 is a schematic sectional view of the step of aligning the first alignment region 212 in the above alignment process. When forming the first mask layer 310 by using the inkjet printing process, the height of the black matrix 810 can function as the retaining wall, so as to avoid the first mask layer 310 from diffusing to the first alignment region 212 to be treated by the particle beam from the adjacent fourth alignment region 218.

It should be noted that in FIG. 2D, since the alignment directions of the first, second, third, and fourth alignment regions 212, 214, 216, 218 are different, if an LCD panel (not shown) is assembled by the color filter substrate 900 and another substrate, the assembled LCD panel can have a larger viewing range. Moreover, the LCD panel can achieve the wide viewing angle without using the design of protrusions or slit patterns in the color filter substrate 900. Therefore, mura does not easily occur in the LCD panel assembled by the color filter substrate 900, and the LCD has higher transmittance and aperture ratio.

Similarly, in the present embodiment, the method of fabricating a color filter substrate is illustrated by forming the alignment film 500 having four alignment regions. However, the method of fabricating a color filter substrate provided by the present invention is not limited to forming the alignment film 500 having four alignment regions. In addition, each of the color filter patterns 820 is not limited to correspond to four alignment regions.

In the above method of fabricating a color filter substrate, the thickness of the formed black matrix 810 is larger than that of the color filter patterns 820. However, the method of fabricating a color filter substrate of the present invention is not limited to form the black matrix 810 with the thickness larger than that of the color filter patterns 820. In another embodiment, the black matrix 810 and the color filter patterns 820 have similar thickness. When performing the inkjet printing process to form a mask layer in a specific alignment region, the sprayed organic material may cause an uneven profile of the edge of the mask layer due to diffusion, thus resulting in the incomplete alignment of the edges of the alignment regions. However, since the edges of the alignment regions may correspond to the position of the black matrix 810, and the edges of the incompletely aligned alignment regions may be shielded. Therefore, after an LCD panel (not shown) is formed by assembling the color filter substrate (not shown), the display quality of the LCD panel is not affected.

To sum up, the alignment method of alignment film, the method of fabricating an active device array substrate, and the method of fabricating a color filter substrate provided by the present invention have at least the following advantages.

1. In the methods of fabricating an active device array substrate and fabricating a color filter substrate provided by the present invention, the alignment method of alignment film employs the inkjet printing process to form mask layers. Since mask layers are formed on specific regions by using the inkjet printing process, compared with the conventional method, the methods of fabricating an active device array substrate and fabricating a color filter substrate provided by the present invention are simple and have a low cost.

2. The method of fabricating an active device array substrate of the present invention employs the above alignment method to form alignment films, and the fabricated active device array substrate can be used to assemble an LCD panel. Since the LCD panel can achieve the wide viewing angle without using the design of recess patterns or protrusions in the active device array substrate, mura does not easily occur in the LCD panel assembled by the active device array substrate, and the LCD has higher transmittance and aperture ratio.

3. The method of fabricating a color filter substrate of the present invention employs the above alignment method to form alignment films, the fabricated color filter substrate can be used to assemble an LCD panel. Since the LCD panel can achieve the wide viewing angle without using the design of protrusions in the color filter substrate, mura does not easily occur in the LCD panel assembled by the color filter substrate, and the LCD has higher transmittance and aperture ratio.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating an active device array substrate, comprising:
   providing a substrate;
   forming a pixel array on the substrate;
   forming an alignment material layer on the pixel array, the alignment material layer having a plurality of alignment regions;
   forming a mask layer on a portion of the alignment regions of the alignment material layer by using an inkjet printing process, so as to expose another portion of the alignment regions of the alignment material layer;
   performing a particle beam alignment process to the exposed alignment material layer;
   removing the mask layer;
   forming another mask layer on the alignment material layer which has been treated by the particle beam by using the inkjet printing process, so as to expose the alignment material layer not treated by the particle beam;
   performing another particle beam alignment process to the exposed alignment material layer; and
   removing the another mask layer.

2. The method of fabricating an active device array substrate as claimed in claim 1, wherein the pixel array comprises a plurality of sub-pixels, and each of the sub-pixels corresponds to at least two alignment regions.

3. The method of fabricating an active device array substrate as claimed in claim 1, wherein the pixel array comprises a plurality of sub-pixels, each of the alignment regions corresponds to at least two sub-pixels, and the alignment direction of each alignment region is different from the alignment directions of other alignment regions adjacent thereto.

4. The method of fabricating an active device array substrate as claimed in claim 1, wherein the pixel array comprises a plurality of sub-pixels, each of the alignment regions corresponds to one sub-pixel, and the alignment direction of each alignment region is different from the alignment directions of other alignment regions adjacent thereto.

5. The method of fabricating an active device array substrate as claimed in claim 1, wherein the alignment directions of the two particle beam alignment processes are different.

6. The method of fabricating an active device array substrate as claimed in claim 1, wherein the material of the mask layers comprises organic material.

7. The method of fabricating an active device array substrate as claimed in claim 1, wherein:
the formed alignment material layer has a first alignment region, a second alignment region, a third alignment region, and a fourth alignment region;
forming a first mask layer in the second, third, and fourth alignment regions of the alignment material layer by using the inkjet printing process, so as to expose the first alignment region of the alignment material layer;
performing a first particle beam alignment process to the first alignment region of the alignment material layer;
removing the first mask layer;
forming a second mask layer in the first, third, and fourth alignment regions of the alignment material layer by using the inkjet printing process, so as to expose the second alignment region of the alignment material layer;
performing a second particle beam alignment process to the second alignment region of the alignment material layer;
removing the second mask layer;
forming a third mask layer in the first, second, and fourth alignment regions of the alignment material layer by using the inkjet printing process, so as to expose the third alignment region of the alignment material layer;
performing a third particle beam alignment process to the third alignment region of the alignment material layer;
removing the third mask layer;
forming a fourth mask layer in the first, second, and third alignment regions of the alignment material layer by using the inkjet printing process, so as to expose the fourth alignment region of the alignment material layer;
performing a fourth particle beam alignment process to the fourth alignment region of the alignment material layer; and
removing the fourth mask layer.

8. The method of fabricating an active device array substrate as claimed in claim 7, wherein the alignment directions of the first alignment region, the second alignment region, the third alignment region, and the fourth alignment region are all different.

9. The method of fabricating an active device array substrate as claimed in claim 1, wherein the material of the alignment material layer comprises polyimide, polyamide, polyvinyl alcohol (PVA), polyvinyl chloride (PVC), diamond like carbon (DLC), SiC, $SiO_2$, $Si_3N_4$, $Al_2O_3$, or $SnO_2$.

10. The method of fabricating an active device array substrate as claimed in claim 1, after forming the pixel array, further comprising forming an insulating layer on the pixel array, wherein the insulating layer has a plurality of recesses each of which corresponds to one of the alignment regions.

11. A method of fabricating a color filter substrate, comprising:
providing a substrate;
forming a color filter array on the substrate;
forming an alignment material layer having a plurality of alignment regions on the color filter array;
forming a mask layer on a portion of the alignment regions of the alignment material layer by using an inkjet printing process, so as to expose another portion of alignment regions of the alignment material layer;
performing a particle beam alignment process to the exposed alignment material layer;
removing the mask layer;
forming another mask layer on the alignment material layer which has been treated by the particle beam by using the inkjet printing process, so as to expose the alignment material layer not treated by the particle beam;
performing another particle beam alignment process to the exposed alignment material layer; and
removing the another mask layer.

12. The method of fabricating a color filter substrate as claimed in claim 11, wherein the color filter array comprises a plurality of color filter patterns, and each of the color filter patterns corresponds to at least two alignment regions.

13. The method of fabricating a color filter substrate as claimed in claim 11, wherein the color filter array comprises a plurality of color filter patterns, each of the alignment regions corresponds to at least two color filter patterns, and the alignment direction of each alignment region is different from the alignment directions of other alignment regions adjacent thereto.

14. The method of fabricating a color filter substrate as claimed in claim 11, wherein the color filter array comprises a plurality of color filter patterns, each alignment region corresponds to one color filter pattern, and the alignment direction of each alignment region is different from the alignment directions of other alignment regions adjacent thereto.

15. The method of fabricating a color filter substrate as claimed in claim 11, wherein the alignment directions of the two particle beam alignment processes are different.

16. The method of fabricating a color filter substrate as claimed in claim 11, wherein the material of the mask layers comprises organic material.

17. The method of fabricating a color filter substrate as claimed in claim 11, wherein:
the formed alignment material layer has a first alignment region, a second alignment region, a third alignment region, and a fourth alignment region;
forming a first mask layer in the second, third, and fourth alignment regions of the alignment material layer by using the inkjet printing process, so as to expose the first alignment region of the alignment material layer;
performing a first particle beam alignment process to the first alignment region of the alignment material layer;
removing the first mask layer;
forming a second mask layer in the first, third, and fourth alignment regions of the alignment material layer by using the inkjet printing process, so as to expose the second alignment region of the alignment material layer;
performing a second particle beam alignment process to the second alignment region of the alignment material layer;
removing the second mask layer;

forming a third mask layer in the first, second, and fourth alignment regions of the alignment material layer by using the inkjet printing process, so as to expose the third alignment region of the alignment material layer;

performing a third particle beam alignment process to the third alignment region of the alignment material layer;

removing the third mask layer;

forming a fourth mask layer in the first, second, and third alignment regions of the alignment material layer by using the inkjet printing process, so as to expose the fourth alignment region of the alignment material layer;

performing a fourth particle beam alignment process to the fourth alignment region of the alignment material layer; and removing the fourth mask layer.

18. The method of fabricating a color filter substrate as claimed in claim 17, wherein the alignment directions of the first alignment region, the second alignment region, the third alignment region, and the fourth alignment region are all different.

19. The method of fabricating a color filter substrate as claimed in claim 11, wherein the material of the alignment material layer comprises polyimide, PVA, PVC, DLC, SiC, $SiO_2$, $Si_3N_4$, $Al_2O_3$, or $SnO_2$.

20. The method of fabricating a color filter substrate as claimed in claim 11, wherein the method of forming the color filter array comprises forming a black matrix on the substrate and forming a plurality of color filter patterns between the patterns of the black matrix, wherein the thickness of the black matrix is larger than that of the color filter patterns.

* * * * *